United States Patent Office 2,950,328
Patented Aug. 23, 1960

2,950,328
CYCLOPROPYL DERIVATIVES AND PROCESSES FOR MAKING THE SAME

Milton Orchin, Cincinnati, Ohio, assignor to Houdry Process Corporation, Wilmington, Del., a corporation of Delaware No Drawing. Filed Dec. 21, 1955, Ser. No. 554,427

3 Claims. (Cl. 260—648)

The present invention relates to cyclopropyl derivatives, and to processes for making the same, and in particular, relates to cyclopropyl derivatives having extracyclic alpha-beta unsaturated carbon atoms.

The present invention has as an object the provision of a method for forming cyclopropyl derivatives.

The present invention has as another object the provision of a method for forming cyclopropyl derivatives having extra-cyclic alpha-beta unsaturated carbon atoms.

The present invention has as another object the provision of a method for forming cyclopropyl ring derivatives having alpha-beta unsaturated carbon atoms and having at least one halogen atom on a ring carbon atom, other than the olefin substituted carbon atom.

The present invention has as yet another object the provision of a method for forming cyclopropyl compounds from conjugated diolefinic compounds.

The present invention has as a yet further object the provision of novel cyclopropyl derivatives, including by way of example 1,1-dichloro-2-vinyl cyclopropane.

These and other objects of the present invention are accomplished by the addition of a haloalkylating agent to an olefinic compound having an adjacent activating group selected from the class consisting of aromatic groups and olefinic groups, said olefinic compound being, preferably a conjugated diolefinic compound, in the presence of an alkaline condensing agent to form a cyclopropyl derivative. If the diolefinic compound consists of a conjugated diolefinic compound, then the resultant cyclopropyl derivative will have extra-cyclic alpha-beta unsaturated carbon atoms, when the reactants are generally in the ratio of 1 to 1.

Novel compounds such as 1,1-dichloro-2-vinyl cyclopropane can be converted to known compounds such as ethylcyclopropane so that the method of the present invention may be useful in preparing both known compounds and novel compounds. The cyclopropyl derivatives that can be prepared in accordance with the present invention comprise:

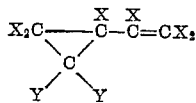

where X is a hydrogen atom or an alkyl radical, and where Y is a hydrogen atom or a negative group, such as halogen, carboxylic, aryl groups, etc. In one preferred embodiment at least one Y is a halogen.

As examples of cyclopropyl derivatives of the present invention may be mentioned: 1,1-dichloro-2-methyl-2-vinyl cyclopropane; 1,1-dichloro-2-isopropenyl cyclopropane; 1,1-dichloro-2-vinyl cyclopropane, etc.

The process of the present invention is primarily applicable to conjugated diolefinic compounds, such as: butadiene; isoprene; 1,3-cyclopentadiene; 3-vinyl cyclohexene; and related compounds reacting in similar manner such as styrene; vinyl pyridine; stilbene; and the like.

A wide variety of haloalkylating agents may be utilized. In the preferred embodiment of the present invention such agents include a plurality of halogen atoms, a hydrogen atom on the reactive carbon atom, and no hydrogen atom on carbon atoms alpha to the reactive carbon atom. These haloalkylating agents therefore comprise the formula:

where Y is a halogen atom, and X is a negative group such as a halogen atom, phenyl radical, carboxyl radical or the like but is other than an alkyl group containing an alpha hydrogen atom. Examples of such haloalkylating agents include: chloroform; bromoform; iodoform; dichloromethane; dichloroacetic acid; dichloroacetone; pentachloroacetone; benzal chloride; dibromomethane; difluoromethane; and the like.

A wide variety of alkaline condensing agents may be utilized, such as: potassium tertiary butoxide; sodium isopropoxide; elemental potassium; lithium propoxide; aluminum butoxide; lithium hydroxide; potassium hydroxide; magnesium ethylate; sodium methylate; and the like.

The process of the present invention may be effected over a wide range of temperatures and pressures, but preferably is effected at as low a temperature as is feasible in order to avoid polymerization of the diolefinic compound.

The process and compositions of the present invention will become more readily apparent from a consideration of the following examples:

*Example 1*

The preparation of 1,1-dichloro-2-methyl-2-vinylcyclopropane was effected as follows:

Potassium isopropoxide was prepared by dissolving about 50 g. potassium in 600 ml. dry isopropyl alcohol. The excess isopropyl alcohol was removed by distillation and heating in vacuo. The remaining salt was suspended in about 200 ml. of pentane and the mixture cooled to 0° C. Approximately 150 ml. of isoprene were added to the mixture and, while cold, about 150 g. of chloroform were added dropwise with stirring. After all the chloroform had been added, the mixture was stirred for two hours and then treated with water. The organic phase was separated and dried. The solvent was evaporated and the residue distilled in vacuo to give 28.4 g. of a dense oil (14.8% yield) boiling at 60–64° C. at about 30 mm. pressure. The oil had a density $$D_{H_2O}^{30} = 1.1280$$

and a refractive index $n_D^{30}$ 1.4732.

These properties lead to an observed molar refraction of 37.8 compared to a calculated molar refraction of 37.4. Analysis for chlorine gave 45.6% compared to 46.9% calculated for $C_6H_8Cl_2$, 1,1-dichloro-2-methyl-2-vinylcyclopropane.

*Example 2*

The preparation of 1-methyl-1-vinylcyclopropane was effected as follows:

15.1 grams of 1,1-dichloro-2-methyl-2-vinylcyclopropane prepared in accordance with Example 1 and 4 molar equivalents thereof of elemental sodium and liquid ammonia in the presence of methanol yielded about 1 gram of 1-methyl-1-vinylcyclopropane, a lighter-than-water hydrocarbon oil, which gave a test for unsaturation. Hydrogenation of this oil produced rapid absorption of one mole equivalent of hydrogen. Mass spectrometric analysis of the hydrogenated material demonstrated it to be principally the known compound 1-ethyl-1-methylcyclopropane.

Detailed analysis of the products obtained in Example 1 also revealed the presence of a minor amount of 1,1-dichloro-2-isopropenylcyclopropane which after dehalogenation and hydrogenation yielded isopropylcyclopropane.

Example 3

The condensation of butadiene and chloroform to produce 1,1-dichloro-2-vinylcyclopropane was effected as follows:

Butadiene was reacted with chloroform and potassium *t.* butyrate in essentially the same manner as was described above in Example 1 for isoprene with the additional precaution of a low temperature reflux using butane as a hydrocarbon diluent in the reaction to avoid the loss of volatile butadiene. The use of butane as a diluent permits lower reflux temperatures to be used, increasing the yield and giving a better control of the reaction.

At 0° C., the reaction produced a 20% yield while at −40° C. a 25% yield was obtained, probably due to the better conservation of butadiene in the reaction system.

The 1,1-dichloro-2-vinyl-cyclopropane had the following physical characteristics: a refractive index $n_D^{30}$ of 1.4719, a boiling point at 32 millimeters mercury pressure of 40° C., and a chlorine content of 49.9 percent plus or minus 0.4 percent (compared with the calculated chlorine content of 51.7 percent). Infrared analysis of this compound showed the presence of a cyclopropyl ring, a monoolefinic non-cyclic structure attributable to the cyclopropane ring with an adjacent vinyl group, and some aspects of diolefinic structure for cyclopropyl and adjacent vinyl groups. A mass spectrometric analysis showed the presence of the following groups: dichloro; vinyl; no cyclopentyl, and no higher molecular weight compounds.

The quantitative dehalogenation of 1,1-dichloro-2-vinyl-cyclopropane with 4 equivalents of sodium in liquid ammonia indicated the presence of 2 atoms of chlorine per molecule, and the quantitative reduction of this compound (vinylcyclopropane, a previously known compound) with hydrogen produces ethyl cyclopropane.

The residual olefinic group in the compounds of the present invention permits a wide variety of derivatives to be formed. Thus, the olefinic group may be oxidized to form a ketone or acid derivative; or may be hydroxylated to form a glycol derivative; or may be oxidized to form the epoxide derivative; or ozonized to form the ozonide derivative and the acid; or may be halogenated; or may be polymerized; or alkylated.

Furthermore, the halogen derivatives of the compounds of the present invention may be converted to nitrile groups and then reduced to the amine group, or oxidized to the acid or amide. Alternatively, the halogen derivatives may be aminated; alkylated as by the Wurtz reaction with sodium metal; hydrolysed to the alcohol or ketone; or reacted to form a metallo-organic derivative.

The compounds of the present invention are useful intermediates for the formation of insecticides of

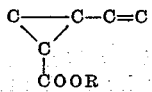

type.

The present invention may be embodied in other specific forms without departing from the spirit or essential attributes thereof and, accordingly, reference should be made to the appended claims, rather than to the foregoing specification as indicating the scope of the invention.

It is claimed:
1. 1,1-dichloro-2-methyl-2-vinylcyclopropane.
2. 1,1-dichloro-2-isopropenylcyclopropane.
3. 1,1-dichloro-2-vinylcyclopropane.

References Cited in the file of this patent

UNITED STATES PATENTS 2,276,203   Kharasch _____ Mar. 10, 1942

OTHER REFERENCES

"Faraday's Encyclopedia of Hydrocarbon Compounds," vol. 1b, sheet 05014.70.01 and vol 2a sheets 06051.00.01 and 06051.00.91 (1953).

Doering et al.: "Jour. Am. Chem. Soc.," vol. 76, pp. 6162–5 (1954).